US007472925B2

(12) United States Patent
Freeman et al.

(10) Patent No.: US 7,472,925 B2
(45) Date of Patent: Jan. 6, 2009

(54) ERGONOMIC SEATBELT FOR IMPROVED BELT SAFETY AND COMFORT

(75) Inventors: Basil M. Freeman, Howell, MI (US); Jack Freeman, Webberville, MI (US)

(73) Assignee: Van Freeman Industries LLC, Holt, MI (US)

( * ) Notice: Subject to any disclaimer, the term of this patent is extended or adjusted under 35 U.S.C. 154(b) by 232 days.

(21) Appl. No.: 11/248,402

(22) Filed: Oct. 12, 2005

(65) Prior Publication Data

US 2006/0076764 A1 Apr. 13, 2006

Related U.S. Application Data

(60) Provisional application No. 60/617,092, filed on Oct. 12, 2004.

(51) Int. Cl.
*B60R 22/00* (2006.01)
*B60R 22/12* (2006.01)

(52) U.S. Cl. .................. 280/801.1; 297/468; 428/35.2; 139/387 R

(58) Field of Classification Search ............. 280/801.1, 280/808; 297/468, 482, 483, 486; 428/35.2, 428/35.5, 36.1, 36.2; 139/389, 390, 387 R
See application file for complete search history.

(56) References Cited

U.S. PATENT DOCUMENTS 1,129,037 A * 2/1915 Jennings ................. 139/387 R
5,256,466 A * 10/1993 Berringan et al. ........... 428/166
6,007,092 A 12/1999 Martz
6,203,110 B1 * 3/2001 Proteau et al. .............. 297/483
6,217,063 B1 4/2001 Takeuchi
6,244,621 B1 6/2001 Kameyoshi et al.
6,409,271 B1 6/2002 Caramanis
6,419,263 B1 * 7/2002 Busgen et al. .............. 280/733

(Continued)

FOREIGN PATENT DOCUMENTS

DE 18 73 895 U 6/1963

(Continued)

*Primary Examiner*—Ruth Ilan
*Assistant Examiner*—Drew J. Brown
(74) *Attorney, Agent, or Firm*—Howard & Howard Attoryneys, P.C.

(57) ABSTRACT

An improved ergonomic seatbelt and method of forming a seatbelt is provided that performs as a safer and more comfortable seatbelt by eliminating the rough edges of conventional seatbelts that are likely to cause discomfort due to friction and cut into a seatbelt user during a high speed crash. Further, the improved ergonomic seatbelt does not require multiple components or inflation, thereby reducing cost and simplifying the manufacturing process. The inventive seatbelt may include a longitudinal belt with a longitudinal axis and first and second longitudinal ends on opposite sides of the longitudinal axis. The first and second longitudinal ends comprise folded sections without an edge for providing improved comfort and safety to a user of the seatbelt. The inventive method may include providing a thin sheet with a longitudinal axis and first and second longitudinal ends, folding under the first and second longitudinal end of the thin sheet to form first and second folded sections of the seatbelt; and attaching a central portion of the thin sheet, a portion of the thin sheet proximate the first longitudinal end, and a portion of the thin sheet proximate the second longitudinal end.

9 Claims, 3 Drawing Sheets

18
14
12
16
20

U.S. PATENT DOCUMENTS 6,439,601 B1 8/2002 Iseki
6,698,790 B2 * 3/2004 Iseki et al. .................. 280/733
6,705,244 B1 3/2004 Berger et al.
6,951,350 B2 * 10/2005 Heidorn et al. ............. 280/733

FOREIGN PATENT DOCUMENTS

DE 24 33 281 A1 1/1976
DE 27 06 284 A1 8/1978
DE 41 19 777 A1 12/1991
EP 0 119 684 A 9/1984

* cited by examiner

ERGONOMIC SEATBELT FOR IMPROVED BELT SAFETY AND COMFORT

RELATED APPLICATIONS

The present application claims the benefit of priority to Provisional Application Ser. No. 60/617,092 filed Oct. 12, 2004.

BACKGROUND OF INVENTION a. Field of Invention

The invention relates generally to seatbelts for automobiles or the like, and more particularly, to an ergonomic seatbelt for improved seatbelt safety and comfort during general use and in the event of seatbelt tensioning during a crash.

b. Description of Related Art

Conventional seatbelts are wide and flat and are generally composed of woven vinyl. Upon a high speed crash, the rough edges of wide and flat seatbelts are likely to cut into the user of the seatbelt. Furthermore, wide and flat seatbelts are likely to cause discomfort at points of contact to users of various sizes. Attempts have been made to provide increased user comfort, but significant disadvantages to these modified seatbelts remain. Modified seatbelts may comprise inflatable seatbelts and/or seatbelt covers.

For example, U.S. Pat. No. 6,217,188 to Takeuchi, as illustrated in FIG. 5 discloses an inflatable seatbelt having a belt body 11, cushion layer 13, and cover 12. A gas may be introduced into belt body 11, altering the belt away from the wide and flat shape for user comfort. The cushion layer 13 and cover 12 additionally improve the feel of the inflatable belt.

One exemplary drawback of Takeuchi is that multiple components, namely the cushion layer 13 and cover 12, are necessary to improve the comfort and feel of the belt, thereby requiring greater manufacturing costs and time. Additionally, belt body 11 requires inflation to provide comfort and is susceptible to breakage/puncture with repetitive use. The present invention achieves improved comfort and safety without being configured to inflate, thereby having greater longevity of use, requiring fewer raw materials, and lowering manufacturing costs.

The inventors herein have recognized a need for an ergonomic seatbelt and method of forming an ergonomic seatbelt for improved safety and comfort that will minimize and/or eliminate the above-identified deficiencies. It would be beneficial to provide a seatbelt which provides comfort to users of various sizes and is capable of long term use without requiring multiple components or inflation, thereby reducing cost and simplifying the manufacturing process of the seatbelt.

SUMMARY OF THE INVENTION

The present invention provides a seatbelt comprising a longitudinal belt with a longitudinal axis and first and second longitudinal ends on opposite sides of the longitudinal axis. The first and second longitudinal ends comprise folded sections without an edge for providing improved comfort and safety to a user of the seatbelt. The longitudinal belt may comprise woven vinyl. The longitudinal belt may comprise a single thin sheet with opposed longitudinal edges. The longitudinal edges of the thin sheet may be folded under and attached along a generally central portion of the longitudinal belt to define the folded sections of the longitudinal belt. The seatbelt may include stitching in a generally central lengthwise direction of the seatbelt for attaching the longitudinal edges of the thin sheet to form the seatbelt.

The longitudinal belt may comprise a pair of thin sheets with opposed longitudinal edges. Each of the pair of thin sheets may be folded at about a mid-point such that the longitudinal edges of the first thin sheet are enclosed within the longitudinal edges of the second thin sheet and attached along a generally central portion of the longitudinal belt to define the folded sections of the longitudinal belt. The seatbelt may include stitching in a generally central lengthwise direction of the seatbelt for attaching the longitudinal edges of the thin sheets to form the seatbelt.

The longitudinal belt may comprise a thin tube. The tube may be fastened together at a generally central portion of the tube to define the folded sections of the seatbelt. The seatbelt may include stitching in a generally central lengthwise direction of the seatbelt for fastening the tube together to form the seatbelt.

The invention also provides a method of forming a seatbelt for providing improved comfort and safety to a user of the seatbelt. The method may include providing a thin sheet with a longitudinal axis and first and second longitudinal ends on opposite sides of the longitudinal axis. The thin sheet may comprise woven vinyl. The method may also include folding under the first longitudinal end of the thin sheet to form a first folded section of the seatbelt and folding under the second longitudinal end of the thin sheet to form a second folded section of the seatbelt. The method may further include attaching a central portion of the thin sheet, a portion of the thin sheet proximate the first longitudinal end, and a portion of the thin sheet proximate the second longitudinal end together. The attaching step may include stitching in a generally central lengthwise direction of the seatbelt proximate a central portion of the seatbelt.

The invention also provides another method of forming a seatbelt for providing improved comfort and safety to a user of the seatbelt. The other method may include providing a first and second thin sheet with a longitudinal axis and first and second longitudinal ends on opposite sides of the longitudinal axis. The first and second thin sheets may comprise woven vinyl. The method may also include folding the first thin sheet at about a mid-point of the first thin sheet to form a first folded section of the seatbelt and folding the second thin sheet at about a mid-point of the second thin sheet to form a second folded section of the seatbelt. The method may further include inserting the first and second longitudinal ends of the first thin sheet between the first and second longitudinal ends of the second thin sheet. The method may further include attaching the first and second longitudinal ends of the first and second thin sheets together. The attaching step may include stitching in a generally lengthwise direction of the seatbelt proximate a central portion of the seatbelt.

An ergonomic seatbelt and method of forming a seatbelt in accordance with the present invention are advantageous as compared to existing seatbelts and methods of forming seatbelts. First, the inventive seatbelt and method of forming a seatbelt provides a device which performs as a safer and more comfortable seatbelt, both as a lap strap and/or shoulder strap, for users of various sizes. The device eliminates edges of conventional wide and flat seatbelts that are likely to cause discomfort due to friction and that may cut into the user of a seatbelt during a high speed crash. Second, the inventive seatbelt does not require multiple components, thereby reducing cost and simplifying the manufacturing method of the seatbelt. Third, the inventive seatbelt does not require inflation, thereby improving the longevity of use of the device, requiring fewer components, and further lowering manufacturing costs.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENT

Figure 1:
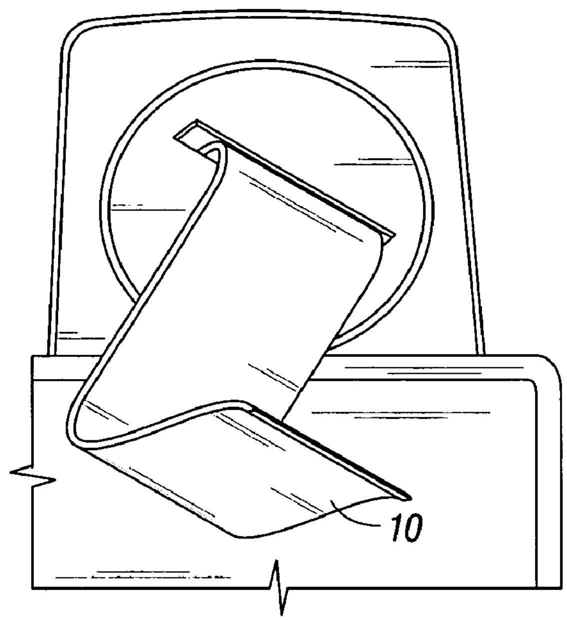
FIG. 1 is a front view of a conventional related art seatbelt.
Figure 2:
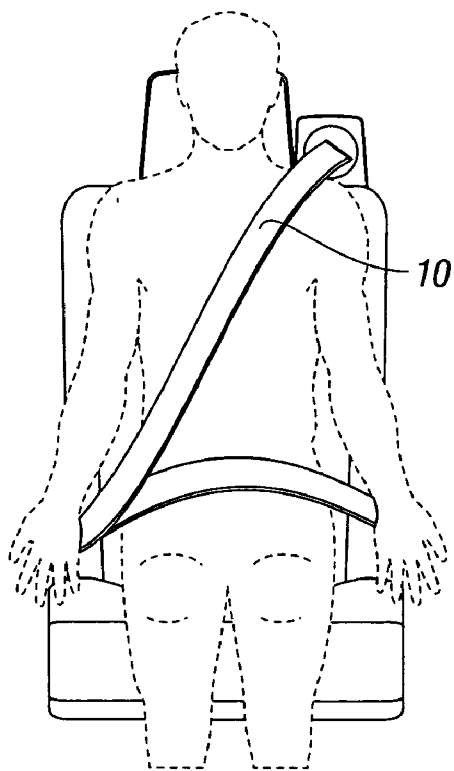
FIG. 2 is a front view illustrative of an individual wearing a seatbelt.
Figure 3A:
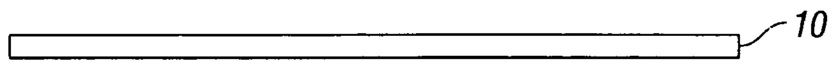
FIGS. 3(*a*), 3(*b*), 3(*c*), 3(*d*), and 3(*e*) are cross-sectional views of a related art seatbelt and various embodiments of a seatbelt according to the present invention, respectively.
Figure 3B:
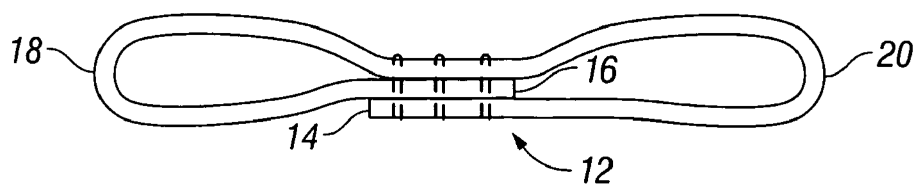
Figure 3C:
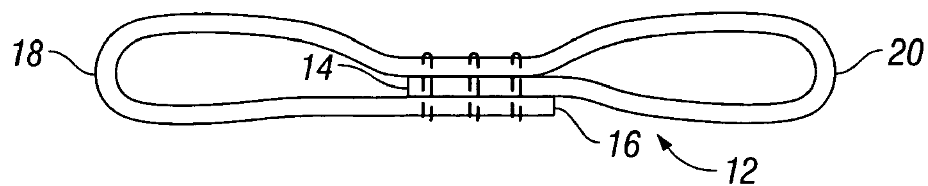
Figure 3D:
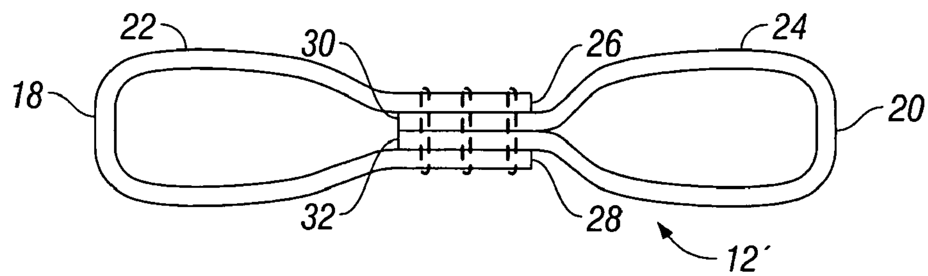
Figure 3E:
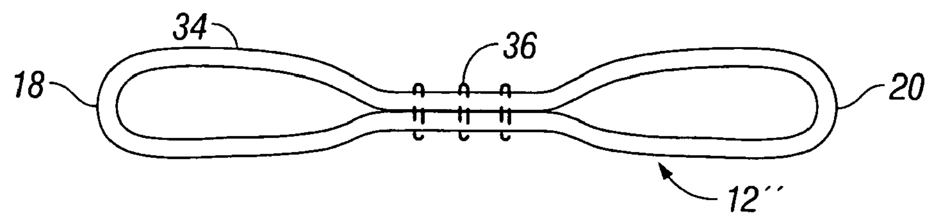
Figure 4:
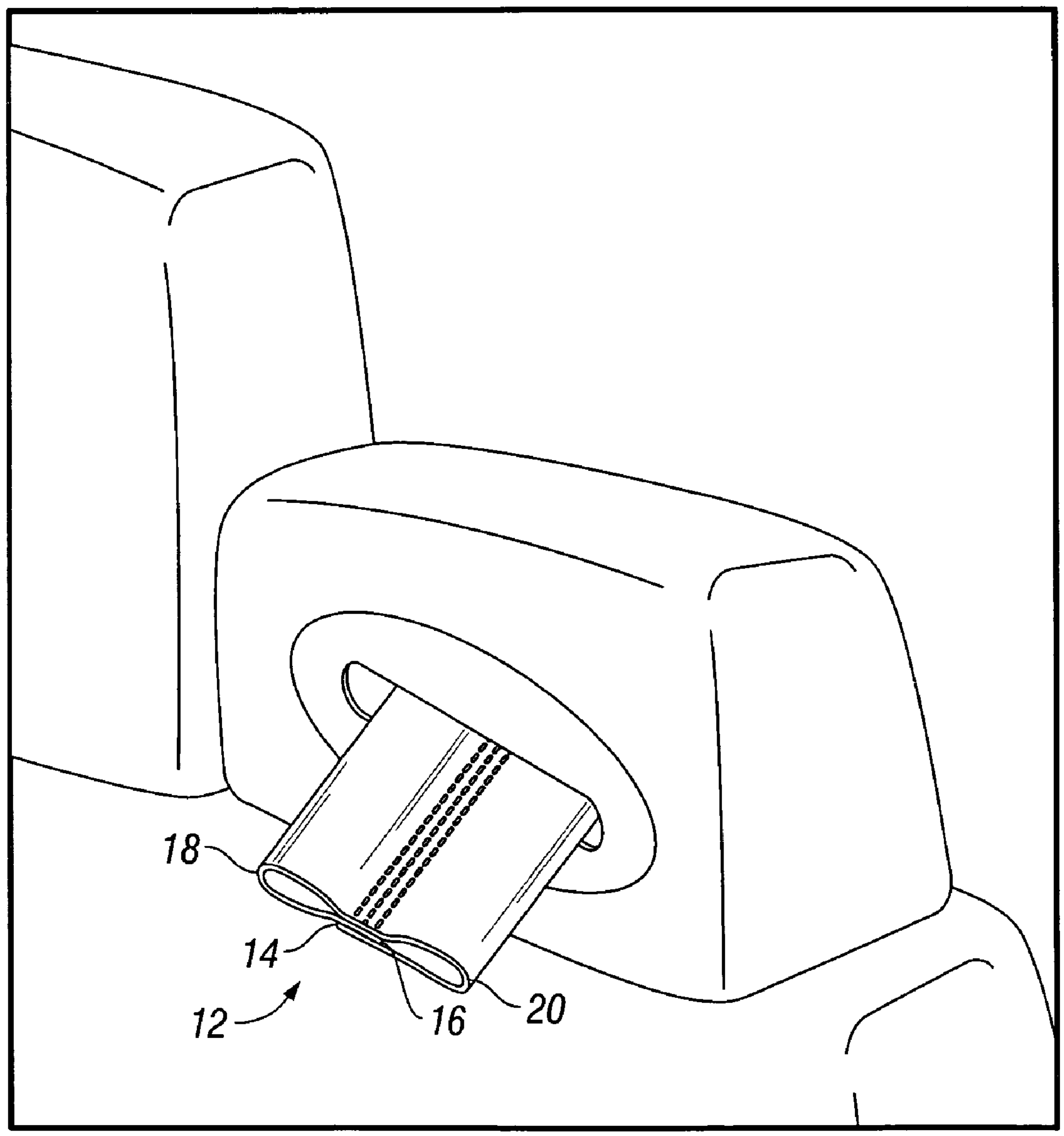
FIG. 4 is a perspective view illustrative of the seatbelt according to an exemplary embodiment of the present invention.

Referring now to the drawings wherein like reference numerals designate corresponding parts throughout the several views, FIGS. 1-4 illustrate a related art seatbelt and various embodiments of a seatbelt according to the present invention, respectively.

Specifically, referring to FIGS. 1 and 3(*a*), existing seatbelts typically include a predetermined width and a thin/flat cross-section. Such seatbelts, such as seatbelt 10, are generally formed of thin stretches of woven vinyl. Conventionally, when in use, seatbelt 10 is worn across the shoulder-blade and torso of an individual, as is well known and shown in FIG. 2.

Seatbelt 10 illustrated in FIGS. 1 and 3(*a*) is problematic in its safety and comfort. From a safety point of view, in the event of a crash, such seatbelts have a tendency to cut or burn the user's neck and/or the shoulder-blade area due to friction. Further, such seatbelts also have a tendency to cut the user's torso. From a comfort point of view, such seatbelts often irritate the exposed areas of a user's neck and/or shoulder-blade areas.

In order to alleviate at least the aforementioned exemplary drawbacks of the conventional seatbelt design of FIGS. 1 and 3(*a*), seatbelt 12 according to the present invention is illustrated in detail in FIGS. 3(*b*)-(*e*) and 4. Specifically, as shown in FIGS. 3(*b*)-(*c*), seatbelt 12 has the same width as a conventional seatbelt 10 shown in FIG. 3(*a*). However, instead of being formed of and having a cross-section of a thin layer of woven vinyl, seatbelt 12 includes a folded over cross-section (see FIGS. 3(*b*)-(*c*)). Seatbelt 12 may therefore be formed by utilizing a single layer of vinyl approximately twice the width of a conventional seatbelt (i.e., seatbelt 10), and folding the layer such that the lengthwise edges 14, 16 meet generally along the center-line of the seatbelt. As shown in FIG. 3(*b*), for example, edge 16 may be folded first, with edge 14 thereby disposed outward of edge 16. As shown in FIG. 3(*c*), for example, edge 14 may be folded first, with edge 16 thereby disposed outward of edge 14. Edges 14, 16 may then be stitched or otherwise attached together so that the outer sections 18, 20 of seatbelt 12 are folded over as shown in FIG. 3(*b*) or 3(*c*) and do not include a rough edge as found in conventional seatbelts (i.e., seatbelt 10).

In another exemplary embodiment, as shown in FIG. 3(*d*), seatbelt 12' has the same width as a conventional known seatbelt 10 shown in FIG. 3(*a*). However, instead of being formed of and having a cross-section of a thin layer of woven vinyl, seatbelt 12' includes a folded over cross-section (see FIG. 3(*d*)). Seatbelt 12' may therefore be formed by utilizing two layers 22, 24 of vinyl each approximately the same width as a conventional seatbelt (i.e., seatbelt 10), and folding each layer 22, 24 at about a mid-point of each layer 22, 24. For example, layer 24 may be folded first and layer 22 may be folded around folded layer 24. Accordingly, the lengthwise edges 26, 28 of layer 24 may thus be enclosed within the lengthwise edges 30, 32 of layer 24. Although not illustrated, one of ordinary skill in the art will recognize that layer 22 may be folded first and layer 24 may be folded around folded layer 22 and remain within the spirit and scope of the present invention. Accordingly, the lengthwise edges 30, 32 of layer 22 may thus be enclosed within lengthwise edges 26, 28 of layer 24. Lengthwise edges 26, 28, 30, 32 may then be stitched or otherwise attached together so that the outer sections 18, 20 of seatbelt 12' are folded over as shown in FIG. 3(*d*) and do not include a rough edge as found in conventional seatbelts (i.e., seatbelt 10).

In another exemplary embodiment, as shown in FIG. 3(*e*), seatbelt 12" has the same width as a conventional known seatbelt 10 shown in FIG. 3(*a*). However, instead of being formed of and having a cross-section of a thin layer of woven vinyl, seatbelt 12" includes a folded over cross-section (see FIG. 3(*e*)). Seatbelt 12" may therefore be formed by utilizing a single tube 34 of vinyl that has no longitudinal edges. Tube 34 may be sewn or attached together at approximately a center 36 of tube 34 as shown in FIG. 3(*e*), so that the outer sections 18, 20 of seatbelt 12" are folded over as shown in FIG. 3(*e*) and do not include a rough edge as found in conventional seatbelts (i.e., seatbelt 10).

Compared to seatbelt 10 of FIG. 3(*a*), seatbelts 12, 12', and 12" thus provide improved comfort due to the softness and resiliency of the outer folded sections 18, 20, rather than outer longitudinal edges of a conventional seatbelt (i.e., seatbelt 10). In the event of a crash, seatbelts 12, 12', and 12" also provide superior safety as compared to seatbelt 10 by reducing the tendency to cut or burn the user's neck and/or shoulder-blade area, or the user's torso, due to friction. Seatbelts 12, 12', and 12" are further advantageous because they do not require multiple components or inflation for operation. Accordingly, the inventive seatbelts have an increased life, a reduced cost, and a simpler manufacturing method.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A seatbelt comprising a longitudinal belt with a longitudinal axis and first and second longitudinal ends on opposite sides of said longitudinal axis, wherein said first and second longitudinal ends comprise folded sections without an edge for providing improved comfort and safety to a user of said seatbelt, said longitudinal belt comprising a pair of thin sheets, each with opposed longitudinal edges, each of said pair of thin sheets is folded at about a mid-point such that said longitudinal edges of said first thin sheet are enclosed within said longitudinal edges of said second thin sheet and attached along a generally central portion of said longitudinal belt to define said folded sections of said longitudinal belt.

2. A seatbelt according to claim 1 wherein said longitudinal belt comprises woven vinyl.

3. A seatbelt according to claim 1 further comprising stitching in a generally central lengthwise direction of said seatbelt for attaching said longitudinal edges of said thin sheets to form said seatbelt.

4. A method of forming a seatbelt for providing improved comfort and safety to a user of said seatbelt, said method comprising the following steps: providing a thin sheet with a longitudinal axis and first and second longitudinal ends on opposite sides of said longitudinal axis; folding under said first longitudinal end of said thin sheet to form a first folded section of said seatbelt; folding under said second longitudinal end of said thin sheet to form a second folded section of said seatbelt; and attaching a central portion of said thin sheet, a portion of said thin sheet proximate said first longitudinal end, and a portion of said thin sheet proximate said second longitudinal end together.

5. A method in accordance with claim 4 wherein said thin sheet comprises woven vinyl.

6. A method in accordance with claim 4 wherein said attaching step further comprises the substep of stitching in a generally lengthwise direction of said seatbelt proximate a central portion of said seatbelt.

7. A method of forming a seatbelt for providing improved comfort and safety to a user of said seatbelt, said method comprising the following steps: providing a first and second thin sheet with a longitudinal axis and first and second longitudinal ends on opposite sides of said longitudinal axis; folding said first thin sheet at about a mid-point of said first thin sheet to form a first folded section of said seatbelt; folding said second thin sheet at about a mid-point of said second thin sheet to form a second folded section of said seatbelt; inserting said first and second longitudinal ends of said first thin sheet between said first and second longitudinal ends of said second thin sheet; and attaching said first and second longitudinal ends of said first and second thin sheets together.

8. A method in accordance with claim 7 wherein said first and second thin sheet comprise woven vinyl.

9. A method in accordance with claim 7 wherein said attaching step further comprises the substep of stitching in a generally lengthwise direction of said seatbelt proximate a central portion of said seatbelt.

* * * * *